(12) United States Patent
Zhang et al.

(10) Patent No.: US 7,979,840 B2
(45) Date of Patent: Jul. 12, 2011

(54) METHOD AND APPARATUS FOR SERVICE-ORIENTED ARCHITECTURE PROCESS DECOMPOSITION AND SERVICE MODELING

(75) Inventors: Liang-Jie Zhang, Cortlandt Manor, NY (US); Dingding Lu, Redmond, WA (US); Yi-Min Chee, Yorktown Heights, NY (US); Ahamed Jalaldeen, Karnataka (IN); Ali Arsanjani, Fairfield, IA (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/554,948

(22) Filed: Oct. 31, 2006

(65) Prior Publication Data

US 2008/0127047 A1    May 29, 2008

(51) Int. Cl.
*G06F 9/44* (2006.01)
*G06F 15/16* (2006.01)
*G06F 15/173* (2006.01)

(52) U.S. Cl. ........ 717/104; 717/109; 717/120; 717/121; 709/203; 709/232; 709/246

(58) Field of Classification Search .................. None
See application file for complete search history.

(56) References Cited

U.S. PATENT DOCUMENTS

| | | | |
|---|---|---|---|
| 5,521,814 A | 5/1996 | Teran et al. | |
| 6,278,977 B1 | 8/2001 | Agrawal et al. | |
| 7,058,853 B1 | 6/2006 | Kavanappillil et al. | |
| 7,657,898 B2 * | 2/2010 | Sadiq | 719/330 |
| 2002/0104068 A1 * | 8/2002 | Barrett et al. | 717/104 |
| 2005/0050141 A1 * | 3/2005 | An et al. | 709/203 |
| 2005/0050311 A1 | 3/2005 | Joseph et al. | |
| 2005/0050549 A1 * | 3/2005 | Joseph et al. | 719/313 |
| 2005/0144226 A1 * | 6/2005 | Purewal | 709/203 |
| 2005/0223109 A1 * | 10/2005 | Mamou et al. | 709/232 |
| 2005/0234969 A1 | 10/2005 | Mamou et al. | |
| 2006/0085750 A1 | 4/2006 | Easton, Jr. et al. | |
| 2008/0033907 A1 * | 2/2008 | Woehler et al. | 707/2 |
| 2008/0126410 A1 * | 5/2008 | Brunswig et al. | 707/104.1 |

FOREIGN PATENT DOCUMENTS

EP    1 065 617    1/2001

(Continued)

OTHER PUBLICATIONS

Ali Arsanjani, Ph.D.; "Service-oriented modeling and architecture"; http://www.ibm.com/developerworks/library/ws-soa-design1/.

(Continued)

*Primary Examiner* — Thuy Dao
*Assistant Examiner* — Isaac T Tecklu
(74) *Attorney, Agent, or Firm* — Ryan, Mason & Lewis, LLP (57) ABSTRACT

Techniques are provided for service-oriented (SOA) process decomposition and service modeling. In one aspect of the invention, the techniques include identifying meta-data entities, attributes of the meta-data entities and relationships between stereotypes of the meta-data model, managing the meta-data model for creating, modifying and removing modeling artifacts, and creating modeling templates from the meta-data model to facilitate addressing at least one need of industry-specific applications. In another aspect the invention, the techniques include packaging the method for SOA process decomposition and service modeling, facilitating lifecycle management of modeling assets, and facilitating maintenance of the modeling assets.

26 Claims, 5 Drawing Sheets

FOREIGN PATENT DOCUMENTS

| EP | 1 457 907 | 9/2004 |
|---|---|---|
| WO | WO 02/102093 | 12/2002 |

OTHER PUBLICATIONS

Simon Johnston; "UML 2.0 Profile for Software Services"; http://www.ibm.com/developerworks/rational/library/05/419_soa/.

Wikipedia; "JavaScript"; http://en.wikipedia.org/wiki/JavaScript.

Wikipedia, "Service-oriented architecture"; http://en.wikipedia.org/wiki/Service-oriented_architecture.

Wikipedia, "Ajax (programming)"; http://en.wikipedia.org/wiki/Ajax_(programming).

Wikipedia, "Portlet"; http://en.wikipedia.org/wiki/Portlet.

Wikipedia, "Model-view-controller"; http://en.wikipedia.org/wiki/Model-view-controller.

IBM, Computer Associates, Oracle, webMethods, Argonne National Laboratory, Fujitsu Laboratories of Europe, Hewlett-Packard, Superceded: Web Services Resource Framework; http://www-128 ibm com/developerworks/library/specification/ws-resource/.

Oasis, "Defining an open framework for modeling and accessing stateful resources using Web services"; http://www.oasis-open org/committees/tc_home.php?wg_abbrev=wsrf.

Oasis, Web Services Resource Framework (WSRF)—Primer v1.2; http://docs.oasis-open.org/wsrf/wsrf-primer-1.2-primer-cd-02.pdf.

U.S. Appl. No. 11/554,680, filed Oct. 31, 2006 titled "Method and Apparatus for Representing and Configuring Flexible and Extensible Presentation Patterns" of Zhang et al.

\* cited by examiner

METHOD AND APPARATUS FOR SERVICE-ORIENTED ARCHITECTURE PROCESS DECOMPOSITION AND SERVICE MODELING

FIELD OF THE INVENTION

The present invention generally relates to information technology, and, more particularly, to a method and apparatus for service-oriented architecture process decomposition and service modeling.

BACKGROUND OF THE INVENTION

Service-oriented architecture (SOA) has been adopted at programming and middleware levels, workflow process levels, and workflow levels, for identifying and creating reusable components. The existing workflow information technology (IT) solutions for SOA transformation ate conducted in an application-specific and ad-hoc way. The existing approaches do not provide formalized guidance for an SOA consulting service.

Currently at the workflow process and workflow level, most SOA consulting service practices are conducted based on presentations and documentation. The existing approaches do not transform the labor and document-based consulting services to software asset-based services.

It would thus be desirable to overcome limitations in existing service-oriented architecture process decomposition and service modeling approaches.

SUMMARY OF THE INVENTION

Principles of the present invention provide techniques for service-oriented architecture process decomposition and service modeling.

For example, in one aspect of the invention, one or more embodiments may include the steps of identifying meta-data entities, attributes of the meta-data entities and relationships between stereotypes of the meta-data model, managing the meta-data model for creating, modifying and removing modeling artifacts, and creating modeling templates from the meta-data model to facilitate addressing at least one need of industry-specific applications.

Further, the techniques for identifying meta-data entities may include iteratively identifying the meta-data entities during the process decomposition to capture a plurality of aspects of the process, and may also include iteratively identifying interactions between the meta-data entities during the identification step to capture additional information.

Also, the techniques for service-oriented architecture (SOA) process decomposition and service modeling may include the steps of enabling value-added services from the modeling templates to provide capabilities comprising at least one of model validation, service discovery service composition, service level agreement (SLA) management and industry-specific solution modeling. One or more embodiments of the invention may also include decomposing processes to sub-steps for guiding process practitioners.

Further, the techniques for service-oriented architecture (SOA) process decomposition and service modeling may include the steps of deriving an SOA method model to provide a genetic framework for service modeling in an SOA solution, deploying the SOA method model for at least one pertinent organization or other entity consulting services platform to increase productivity of at least one practitioner, instantiating the SOA method model to facilitate at least one industry-specific application, and maintaining the SOA method model to facilitate the deployment and instantiation.

In yet another aspect of the invention, one or more embodiments may include the steps of packaging the method for SOA process decomposition and service modeling, facilitating lifecycle management of modeling assets, and facilitating maintenance of said modeling assets. Further, the step of packaging the method for SOA process decomposition and service modeling may include customizing a modeling template for at least one industry-specific application, and may also include providing a general framework for consulting services to build value-added services.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps At least one embodiment of the invention may provide one or more beneficial technical effects, such as, for example, providing a basis for SOA-method practitioners to utilize SOA techniques as a preprocessor to derive SOA solutions for various types of applications.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

In order overcome the limitations of exiting approaches, service-oriented architecture (SOA) process decomposition and service modeling is created to provide techniques to perform, for example, consulting services for SOA transformation.

One or more embodiments of the present invention include a meta-data model that formalizes the SOA techniques for increasing the productivity of consultants as well as solution architects.

Figure 1:
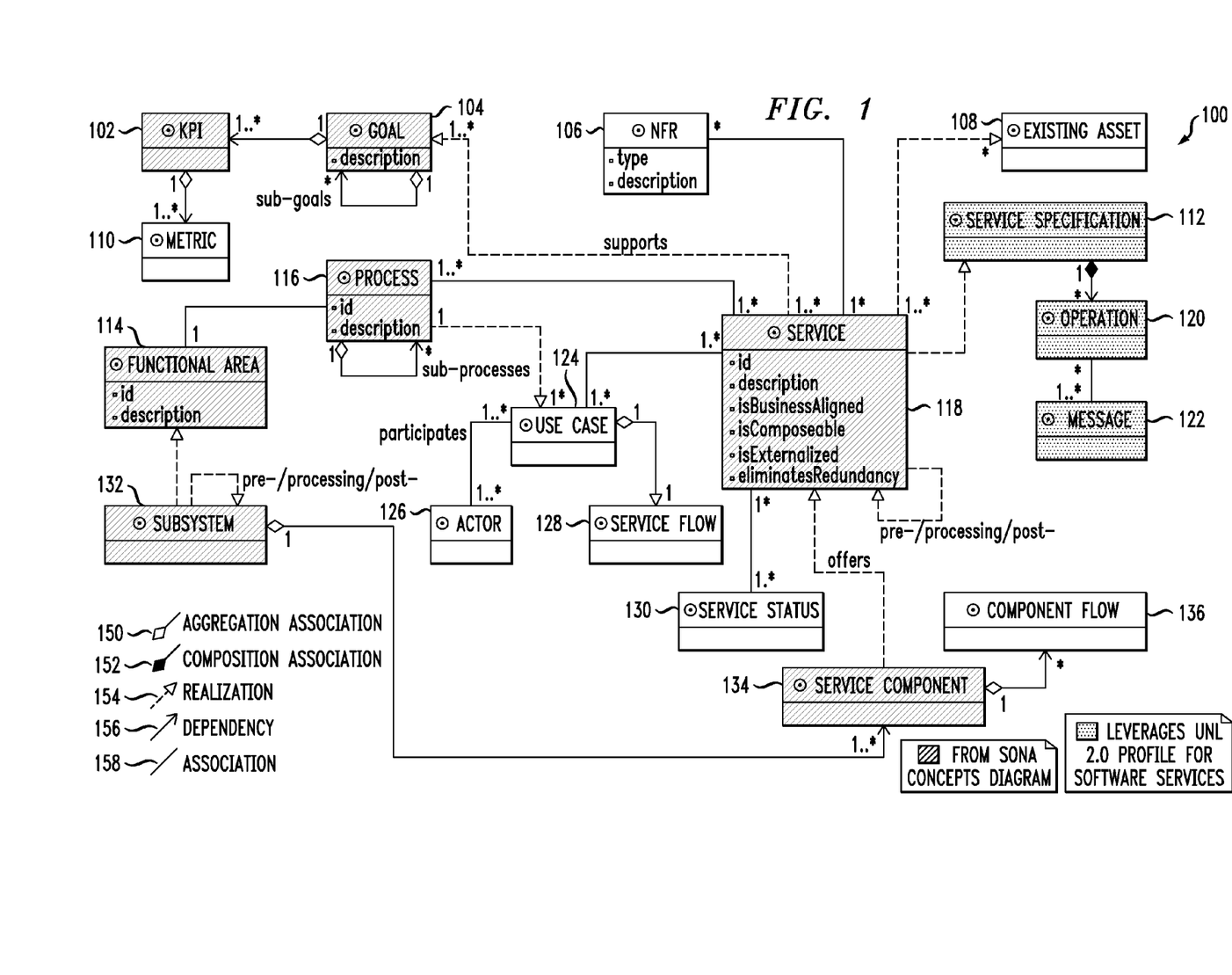
FIG. 1 is a diagram illustrating an exemplary structure of a meta-data model, according to one aspect of the invention.

There ale existing approaches that attempt to provide formalization for SOA consulting services, such as, for example, Unified Modeling Language (UML) 2.0 Profile for Software Services. In one or more embodiments of the present invention, we leverage UML 2.0 Profile for Software Services by utilizing ServiceSpecification stereotypes, operation stereotypes, and message stereotypes as an exemplary way to describe conceptual services, as illustrated in FIG. 1. Therefore, one or more embodiments of the present invention provide a more complete and systematic way to capture the conceptual services defined in existing SOA-method meta-data models. The skilled artisan will appreciate that the Object Management Group UML standard (see www.uml.org) is one exemplary implementation. Alternatively, skilled artisan will also appreciate that the meta-data model is adaptable to other modeling standards besides UML.

As used herein, "meta-data" refers to a collection of data elements that are used to represent and operate objects as well as the relationship among the objects in a certain environment. Also, as used herein, "consultants" refer to role players who provide consulting services in service delivery process, "solution architects" refer to role players who are responsible for the architecture design in solution development and delivery processes, and "practitioner" refers to any role player who provides services from technical or enterprise perspectives. Further, as used herein, "attribute" refers to key elements that define features of a stereotype, and "stereotype" refers to an extensibility mechanism that can be used to identify the purpose of the model element to which you apply it. Also, as used herein, "artifacts" refer to products from steps of a modeling process.

As used herein, SOA process decomposition refers to a process that can include SOA-based services, and SOA solutions refer's to an aggregation of processes, services, data, and other solution elements.

A meta-data model included in one or more embodiments of the invention provides genetic product and/or vendor independent guidance and content for practitioners to apply the SOA techniques in designing SOA solution architecture in a systematic, model-driven fashion.

In one or more embodiments of the invention, an environment is based on an underlying meta-model which captures information that represents SOA process decompositions and service modeling as described herein. The information includes UML Profiles which extend the UML 2.0 meta-model with SOA-method concepts, contains pre-defined modeling elements and provides the basic structure for building new application specific models. One or more embodiments of the present invention serve as a guideline to ensure consistent modeling of SOA solution architecture.

The UML meta-model is a set of concepts which can be adapted to realize different solutions within a pie-defined application-specific domain. In order to model domain-specific features of a SOA solution architecture, and thus capture the various SOA solutions for different applications, a meta-data model of a SOA method is defined to model SOA solution architecture as in FIG. 1.

FIG. 1 shows a diagram 100 illustrating an exemplary structure of a meta-data model, according to one aspect of the invention As shown in FIG. 1, the system includes components including key performance indicator (KPI) stereotype 102, goal stereotype 104, Non-functional requirements (NER) stereotype 106, ExistingAsset stereotype 108, metric stereotype 110, ServiceSpecification stereotype 112, FunctionalArea stereotype 114, process stereotype 116, service stereotype 118, operation stereotype 120, message stereotype 122, UseCase meta-model (also referred to as "meta-class" in the Tables) 124, actor meta-model 126, ServiceFlow stereotype 128, ServiceState stereotype 130, subsystem stereotype 132, ServiceComponent stereotype 134, and ComponentFlow stereotype 136.

The structure of an exemplary meta-data model depicts the identified SOA-method stereotypes, their associated attributes and the relationships between stereotypes. The attributes capture the key elements that define the features of a stereotype. The values of the attributes are initialized during the instantiation of a stereotype for a specific SOA solution.

The relationships between stereotypes model the interaction flows of a SOA technique. There are five types of relationships as follows:

Aggregation association 150 shows that an instance of a stereotype aggregates a set of instances of other stereotypes. For example, a process can be aggregations of a set of sub-processes.

Composition association 152 shows that an instance of a stereotype composes a set of instances of other stereotypes. For example, a ServiceSpecification stereotype 112 is a composition of a set of operations.

Realization 154 shows that an instance of a stereotype is realized by one or multiple instances of another stereotype. For example, ServiceComponent stereotype 134 realizes service stereotype 118.

Dependency 156 shows that an instance of a stereotype depends on an instance of another stereotype. The dependency types include pre-processing, processing and post-processing dependencies. For example, a dependency relationship exists between service stereotype 118 and/or ServiceSpecification stereotype 112 and message 122 stereotypes.

Association 158 shows the mapping relationship between instances of different stereotypes. The mapping types include "one-to-one", "one-to-many", and "many-to-many" mappings. For example, the service stereotype 118 and ServiceState stereotype 130 can have a "many-to-many" mapping relationship.

The meta-model is a UML 2.0-based conceptual view of a SOA-method modeling process. By way of example and not limitation, a major contribution of the meta-model is to provide a basis for SOA-method practitioners to utilize SOA techniques as a preprocessor to derive SOA solutions for various types of applications. One or more embodiments of the present invention may provide one or mole advantages over existing approaches.

An exemplary advantage of the meta-model may include achieving a systematic linkage between processes and services through formal modeling. The meta-data model defines process decompositions and service identification via mappings between processes, sub-processes and candidate services. An identified process or sub-process can be adapted as a candidate service. Thus, a traceable linkage between process decomposition and service identification can be captured. This traceable linkage can be further monitored in the later SOA solution realization.

Another exemplary advantage of the meta-model may include providing decomposability via process decomposition and goal-service realization. The meta-data model shows that the candidate services created from process decomposition can be mapped to an entity goal if the services satisfy a specific entity goal. An entity goal aggregates a set of key performance indicators (KPIs) which define the criteria and objectives required by a specific entity goal. An entity goal can be achieved by a service or a set of services if the criteria and objectives can be satisfied. By mapping services to entity goals, decomposability is provided by breaking down the high-level goals (entity services) into realizable services.

Yet another exemplary advantage of the meta-model may include bridging a conceptual service with one or more executable web services. The meta-data model enables a formalized framework to support transformations from conceptual service to executable web services. The meta-data model identifies candidate services as well as associated attributes such as, for example, NFRs. Once the values of attributes ale instantiated for specific applications, the conceptual service can be implemented into executable web services. Thus, an end-to-end linkage may be constructed starting from high-level entity goals, through decomposition into conceptual services to executable web services implementation.

Another exemplary advantage of the meta-data model may include achieving reusability by providing service discovery to discover existing services. The meta-data model may include providing a service discovery mechanism to utilize existing services for conceptual services. The discovered services can be directly used and aggregated as new services or integrated into existing services. Thus, reusability can be achieved by utilizing existing resources to build new services.

One or more embodiments of the present invention may provide assets or deliverables. An exemplary asset of the meta-data model may include the overall conceptual view of the SOA-method modeling process, thus providing a systematic guidance for SOA-method modeling practitioners.

Another exemplary asset of the meta-data model may include stereotypes of the meta-data model serving as the basis to define SOA-method-modeling-specific UML profiles that are later used to guide the SOA-method modeling practices for different applications.

Yet another exemplary asset of the meta-data model may include, as an example and not a limitation, four UML profiles that are defined for the SOA-method modeling as follows:

SOA-method modeling workflow process profile.
SOA-method modeling services profile.
SOA-method modeling service component profile.
SOA-method modeling activity profile.

A SOA-method modeling workflow process profile may include stereotypes to represent concepts used during the domain decomposition step of the SOA-method modeling methodology.

| Stereotypes | UML 2.0 meta-class |
| --- | --- |
| FunctionalArea | Package |
| Process | Activity |
| Sub-process | ActivityNode |
| EntityGoal | Class |
| Metric | Comment |
| KPI | Constraint |
| ExistingAsset | Classifier |

<<Stereotype>> FunctionalArea
Extends:
   <<metaclass>> Package
Semantics:
   A functional area represents a grouping of workflow functionality consistent with the view of the entity analysts of the entity domain. It may be advantageous to group and categorize workflow functions into functional areas during decomposition. The functional area may provide workflow boundaries for design of information technology (IT) subsystems, and their corresponding components, which realize services.

In an embodiment of the invention, the FunctionalArea stereotype 114 extends the "Package" meta-class in order to model the above workflow functionality grouping. The FunctionalArea package may also capture the services hierarchy in a manner such that candidate services are grouped under corresponding functional areas.
Attributes:

| Name | Type | Document |
| --- | --- | --- |
| Description | String | Description of this functional area |
| Level | String | Describe from which decomposition level this functional area is first derived. |

Input From:
   Component business modeling (CBM) or other domain analyzing results.
Output to:

| Work Product | Usage |
| --- | --- |
| Service Hierarchy | The service hierarchy lists the functional area for each service. |

<<Stereotype>> Process
Extends:

<<metaclass>> Activity
   <<metaclass>> ActivityNode Semantics:
   A "process" represents a workflow process or a portion of a workflow process (sub-process) which is decomposed in the service identification step of the SOA-method model.
Attributes

| Name | Type | Document |
| --- | --- | --- |
| Identification (id) | String | Unique identifier for this process. |
| Description | String | Description of this process. |

Input from:
   Workflow process model, practitioner spreadsheet, and/or process decomposition result.
Output to:

| Work Product | Usage |
| --- | --- |
| Service Model | Process-sub-process decomposition is recorded in the service model. |
| Goal Service Model | The goal service model contains a mapping of services to processes and entity goals. |

<<Stereotype>> EntityGoal
Extends:
   <<metaclass>> Class
Semantics:
   An EntityGoal describes an entity aspiration that is held by an organization. It is advantageous to identify the goals before determining which services are needed to fulfill the goals. The decomposition of goals into sub-goals is modeled by using class hierarchy. Therefore, the KPIs of candidate services and metrics of service quality measurements ate defined.
Attributes:

| Name | Type | Document |
|---|---|---|
| Description | String | Description of this entity goal. |

Input from:
   Entity analyst, and/or practitioner spreadsheet
Output to:

| Work Product | Usage |
|---|---|
| Goal Service Model | The goal service model contains a mapping of services to processes and entity goals. |

<Stereotype>> Metric
Extends:
   <<metaclass>> Comment
Semantics:
   A "metric" represents a specific measurement to collect for analysis in order to determine fulfillment of an entity goal.
   The value of a metric is captured as an attribute.
Attributes:

| Name | Type | Document |
|---|---|---|
| Description | String | Description of this metric. |
| Value | Numerical/interval | Indicate the values of this metric |

Input from:
   Workflow componentization map, and/or practitioner spreadsheet.
Output to:

| Work Product | Usage |
|---|---|
| Goal Service Model | The goal service model contains a mapping of services to processes and entity goals. |

<<Stereotype>> KPI
Extends:
   <<metaclass>> Constraint
Semantics:
   A KPI describes a key performance indicator, which is a quantifiable objective used to measure progress against entity goals.
   The value of a constraint is captured as an attribute.
Attributes

| Name | Type | Document |
|---|---|---|
| Description | String | Description of this KPI. |
| Value | Numerical/interval | Indicate the value of the KPI. |

Input from:
   Entity analyst, and/ox practitioner spreadsheet.
Output to:

| Work Product | Usage |
|---|---|
| Goal Service Model | The goal service model contains a mapping of services to processes and entity goals with their associated key performance indicators. |

A SOA-method modeling services profile may include stereotypes which address service identification, discovery, specification and composition.

| Stereotypes | UML 2.0 meta-class |
|---|---|
| Policy | Comment |
| ExistingAsset | Classifier |
| CandidateService | Class |
| ServiceFlow | Interaction |
| ServiceState | Comment |

<<Stereotype>> Policy
Extends:
   <<metaclass>> Comment
Semantics:
   A "policy" represents rules and restrictions on the use of a service, component, or subsystem. A policy may be attached to an individual element, a set of elements, or it may apply globally.
Attributes

| Name | Type | Document |
|---|---|---|
| Description | String | Description of this policy. |

Input from:
   Workflow componentization map, and/or practitioner spreadsheet.
Output to:

| Work Product | Usage |
|---|---|
| Goal Service Model | The goal service model contains a mapping of services to processes and entity goals. |
| Service Model | Policies are recorded in a service model. |

<<Stereotype>> ExistingAsset
Extends:
   <-metaclass>> Classifier
Semantics:
   An "ExistingAsset" models an existing application or subsystem that can be leveraged for a SOA solution. It identifies the functionalities of an existing asset and metrics associated with the functionalities. This stereotype is meant to be applied in addition to any other applicable stereotypes, in order to tag a model element as representing an existing asset.
   The "ExistingAsset" extends a general class classifier to capture various existing asset types such as, for example, a particular service, component or subsystem.

Attributes:

| Name | Type | Document |
|---|---|---|
| Type | String | The type of the asset such as system, component, and/or application. |
| Description | String | Description of this asset and the functionalities it provides. |

Input from:
 SOA-method model existing asset analysis.
Output to:

| Work Product | Usage |
|---|---|
| Service Hierarchy | The service hierarchy describes existing assets which can be used to realize a service or process. |

<<Stereotype>> CandidateService
Extends:
 <<metaclass>> Class
Semantics:
 A "CandidateService" represents a service (initially, a candidate) which is identified, specified, and realized by the SOA-method model Candidate services may be identified, for example, by three identification techniques—domain decomposition, existing asset analysis and goal-service modeling. The CandidateService stereotype extends the class "metaclass." During service specification, the interface for the service will be specified.
Attributes:

| Name | Type | Documentation |
|---|---|---|
| id | String | Unique Identifier for this service. |
| Description | String | Description of this service. |
| isWorkflowAligned | Boolean | Is this service workflow-aligned? |
| isComposeable | Boolean | Can this service be composed? |
| isExternalized | Boolean | Does this service have an externalized description? |
| eliminatesRedundancy | Boolean | Does this service eliminate redundancy? |
| originId | String | Specifies the origin of the service - workflow process or use case. |
| originType | String | Specifies the origin id of the service - the identifier of the workflow process or use case. |
| realizationDecision | String | Specifies the realization decision for this service, for example, buy, integrate, subscribe, build, and/or transform. |
| Technique | String | Specifies the service identification techniques used (can be multi-valued, fox example, domain decomposition, goal-service modeling, and/or existing asset analysis). |

Input from:
 SOA-method model service identification
Output to:

| Work Product | Usage |
|---|---|
| Service Model | Design aspects and realization decisions about services are captured in all parts of the service model |
| Goal Service Model | The goal service model contains a mapping of services to processes and entity goals. |
| Service Component Model | The service component model documents the allocation of services to components. |

<<Stereotype>> ServiceFlow
Extends:
 <<metaclass>> Interaction
Semantics:
 A "ServiceFlow" models the interaction between services participating in a use case.
Attributes:

| Name | Type | Document |
|---|---|---|
| Description | String | Description of this service flow |

Input from:
 SOA-method model service realization.
<<Stereotype>> ServiceState
Extends:
 <<metaclass>> Comment
Semantics:
 A "ServiceState" models a decision about how to manage a state for a service or set of services. This stereotype is required in order to capture more complete information for state-formed services.
Attributes:

| Name | Type | Document |
|---|---|---|
| Description | String | Description of this state management decision. |

Constraints:
 Only applies to a realized service
Input from:
 SOA-method model service realization.
Output to:

| Work Product | Usage |
|---|---|
| State Management Decisions | Decisions about how to manage state are recorded in the state management decisions. |

<<Stereotype>> NFR
Extends:
 <<metaclass>> Constraint
Semantics:
 A non-functional requirement (NFR) models a non-functional requirement which impacts service realization decisions and the allocation of services to components and subsystems.
Attributes:

| Name | Type | Document |
|---|---|---|
| Description | String | Description of this non-functional requirement. |

-continued

| Name | Type | Document |
|---|---|---|
| Type | String | The type of this non-functional requirement (for example, availability, performance, security). |

Input from:
  Requirements gathering.
Output to:

| Work Product | Usage |
|---|---|
| Service NFRs | Non-functional requirements are documented in the service NFRs. |

A SOA-method modeling service component profile may capture information related to service components.

| Stereotypes | UML 2.0 meta-class |
|---|---|
| ComponentFlow | Interaction |

<<Stereotype>> ComponentFlow
Extends:
  <<metaclass>> Interaction
Semantics:
  A "ComponentFlow" models the interaction between service components in a system.
Attributes:

| Name | Type | Document |
|---|---|---|
| Description | String | Description of this component flow. |

Input from:
  SOA-method modeling service realization.
Output to:

| Work Product | Usage |
|---|---|
| Service Component Model | The service component model describes how service components interact. |

A SOA-method activity profile may include stereotypes used in modeling die steps of a SOA-method itself.

| UML 2.0 meta-class | Stereotype |
|---|---|
| Actor | Entity Analyst |
| Actor | Workflow Architect |
| Class | Workflow Artifact |
| Actor | Workflow Partner |
| Package | Component Specification |
| Package | Domain Decomposition |
| Package | Existing Asset Analysis |
| Use Case | Functional Area Analysis |
| Package | Goal Service Modeling |
| Actor | Organization Unit |
| Use Case | Process Decomposition |
| Package | Realizing service Mapping |

-continued

| UML 2.0 meta-class | Stereotype |
|---|---|
| Actor | Service Analyst |
| Actor | Service Architect |
| Package | Service Specification |
| Actor | SOA Engineer |
| Package | Subsystem Analysis |
| Actor | System Component |
| Class | Type |
| Use Case | Variation Oriented Analysis |

<<Stereotype>> Entity Analyst
Extends:
  <<meta-class>> Actor
Semantics:
  One or more embodiments of the invention define a set of entity-analyst instances (for example, someone in the workflow process layer that may analyze the workflow processes to fulfill a workflow goal), in which each entity-analyst instance plays the same role as related to the workflow architecture layer (for example, the first layer). It is advantageous that an entity analyst provides the insight of the desired workflow behavior's which need to be achieved by later service implementation. The entity analyst works as an outside information collector to provide entity objectives to a SOA-method modeling layer.
Attributes:

| Name | Type | Documentation |
|---|---|---|
| Characteristics | String | Used primarily for entity analysts who will act as customers or users to the SOA-method modeling layer. The physical environment of the entity analyst, the number of entity analyst presents, the entity analyst's domain knowledge, the entity analyst's level of SOA-method modeling knowledge, the entity analyst's experience with other service architect solutions, and other general characteristics such as, for example, gender and age. |

<<Stereotype>> Workflow Architect
Extends:
  <<meta-class>> actor
Semantics:
  One or more embodiments of the invention define a set of workflow architects, in which each workflow architect plays the same role in relation to the workflow. It is advantageous that a workflow architect defines the architecture of workflow-functional components for a particular workflow process to fulfill desired entity goals. Therefore, a workflow architect provides an understanding on how workflow-functional components interact with each other. The workflow architect works as an outside customer to a SOA-method modeling layer who provides workflow-process architecture and requirements to be modeled by SOA-method modeling.
Attributes:

| Name | Type | Documentation |
|---|---|---|
| Characteristic | String | Used primarily for workflow architects who will act as input to the SOA-method modeling layer. The number of individuals workflow architect presents, the SOA-method modeling knowledge |

-continued

| Name | Type | Documentation |
|---|---|---|
| | | level of workflow architects, the workflow architect's familiarity with a particular workflow process. |

<<Stereotype>> Service Analyst
Extends:
    <<meta-class>> actor
Semantics:

One or more embodiments of the invention define a set of service analyst instances, in which each service analyst plays the same role in relation to a SOA-method modeling layer. It may be advantageous that a service analyst understands a particular service from both an entity perspective and a technical perspective. Therefore, a service analyst has the capability to identify desired services based on the input workflow requirements from a workflow architecture layer and direct the service analysis to the correct direction. The service analyst, for example, may be a user who conducts SOA-method modeling.
Attributes:

| Name | Type | Documentation |
|---|---|---|
| Characteristics | String | Used primarily for service analyst who will act as a major player in SOA-method modeling layer. The number of individuals the service analyst represents, the service analyst's level of domain knowledge, the service analyst's knowledge of existing systems and services |

<<Stereotype>> Service Architect
Extends:
    <<meta-class>> actor
Semantics:

One or more embodiments of the invention define a set of service architect instances, in which each service architect plays the same role in relation to the SOA-method modeling layer. It may be advantageous that a service architect understands the interactions and collaborations among different services under conditions of fulfilling a particular entity-goals input from a workflow architecture layer. The service architect may be a user who conducts SOA-method modeling and produces solution decisions.
Attributes:

| Name | Type | Documentation |
|---|---|---|
| Characteristic | String | Used primarily for service architects who will act as a major player in SOA-method modeling layer. The number of individuals the service architect represents, the service architect's knowledge of domain, service and service composition, the service architect's knowledge of other applications or components which might also have interactions with services. |

<<Stereotype>> SOA Engineer
Extends:
    <<meta-class>> actor
Semantics;

One or more embodiments of the invention define a set of SOA engineer instances, in which each SOA engineer instance plays the same role in relation to receiving solution decisions from a SOA-method modeling layer, and conducting development in later SOA-implementation layers. It may be advantageous that a SOA engineer receives concrete information of solution decisions from a SOA-method modeling layer. Therefore, the SOA engineer's implementation knowledge may become a resource to validate the proposed solution decisions by SOA-method modeling.
Attributes:

| Name | Type | Documentation |
|---|---|---|
| Characteristic | String | Used primarily for SOA engineer who will be the customers of SOA-method modeling to receive solution decisions. The number of individuals the SOA engineer represents, the SOA engineer's knowledge level of similar solution decisions, the SOA engineer's skill level of SOA development. |

<<Stereotype>> Workflow Partner
Extends:
    <<meta-class>> actor
Semantics:

A workflow partner-actor operates on the process decomposition step of the domain decomposition package in the identification sub-model of SOA-method modeling. One or more embodiments of the invention define a set of workflow partner instances, in which each workflow partner instance plays the same role in relation to process decomposition. It may be advantageous that a workflow partner participating in the process or sub-process is visible to SOA-method modeling.
Attributes:

| Name | Type | Documentation |
|---|---|---|
| Description | String | Describe the characteristics of a workflow partner. The role it plays in particular processes or sub-processes, the workflow partner's level of participation. |
| Domain | String | Defines the operation domains of a workflow partner. The specific steps of SOA method modeling the workflow partner involves, the set of processes or sub-processes the workflow partner interacts, the level of decomposition |

<<Stereotype>> Organization Unit
Extends:
    <<meta-class>> actor
Semantics:

An organization unit becomes an actor to interact with a particular process during the process decomposition step An organization unit utilizes a process to perform tasks.

An organization unit actor operates on the process decomposition step of the domain decomposition package in the identification sub-model of SOA-method modeling. One or more embodiments of the invention define a set of organization unit instances, in which each organization unit instance plays the same role in relation to process decomposition. It may be advantageous to describe to which decomposition level a particular organization unit will get involved, and its effect on the decomposition.

Attributes:

| Name | Type | Documentation |
|---|---|---|
| Description | String | Describe the characteristics of the organization unit. The number of individual organization units, the category of individual organization unit, and the participation level of individual organization unit. |
| Domain | String | Define the decomposition level in which the organization unit get involved, the set of process or sub-process the organization unit interacts. |

<<Stereotype>> System Component
Extends:
    <<meta-class>> actor
Semantics:
A system component becomes an actor when it accesses the functionalities provided by a particular process during the process decomposition step.

A system component actor operates on the process decomposition step of the domain decomposition package in the identification sub-model of SOA-method modeling. It defines a set of system component instances, in which each system component instance plays the same role in relation to process decomposition It may be advantageous to identify a set of system components which are users of processes of sub-processes in a particular decomposition level.
Attributes:

| Name | Type | Documentation |
|---|---|---|
| Description | String | Describe the features of system component. The functionality of the system component, the system components's level of participation during decomposition. |
| Domain | String | Defines the level of decomposition in which the system component gets involved, the set of processes and sub-processes with which the system component interacts |

<<Stereotype>> Workflow Artifacts
Extends:
    <<meta-class>> class
Semantics:
Workflow artifacts refer to existing assets or commercial software that provide particular services. A workflow artifact is a class component for performing process decomposition, which uses a case in a domain decomposition package of the identification sub-model. Workflow artifacts are involved with the process. The interactions among workflow artifacts, input and output, typically change the state of a process. It may be advantageous to capture those interactions to define message-exchange specifications and data architecture for services.
Attributes:

| Name | Type | Documentation |
|---|---|---|
| Description | String | Describes the workflow artifacts. The role of the workflow artifact in a particular process, the functionalities of the workflow artifact. |
| Input | Open | The message format the specification for the input of a particular workflow artifact. |
| Output | Open | The message format the specification for the output of a particular workflow artifact. |
| Level | String | Describe which decomposition level this workflow artifact gets involved. |

<<Stereotype>> Type
Extends;
    <<meta-class>> class
Semantics:
A "type" is a class component to perform variation-oriented analysis that uses a case in domain decomposition packaging of the identification sub-model. A type identifies the commonalities and variability of possible variations of service identification. A type identifies the commonalities and variability of possible variations to separate more rapidly changing aspects from more stable ones. The commonalities and variability are modeled by using type hierarchy.
Attributes:

| Name | Type | Documentation |
|---|---|---|
| Name | String | Name of the type. |
| Description | String | Describe the variation identified by this particular type. |
| Hierarchy | Boolean | Whether the type is inherited from a parent type. |
| Parent | String | The name of the parent type where this type is inherited. Null if the type is on the top of the hierarchy. |

Figure 2:
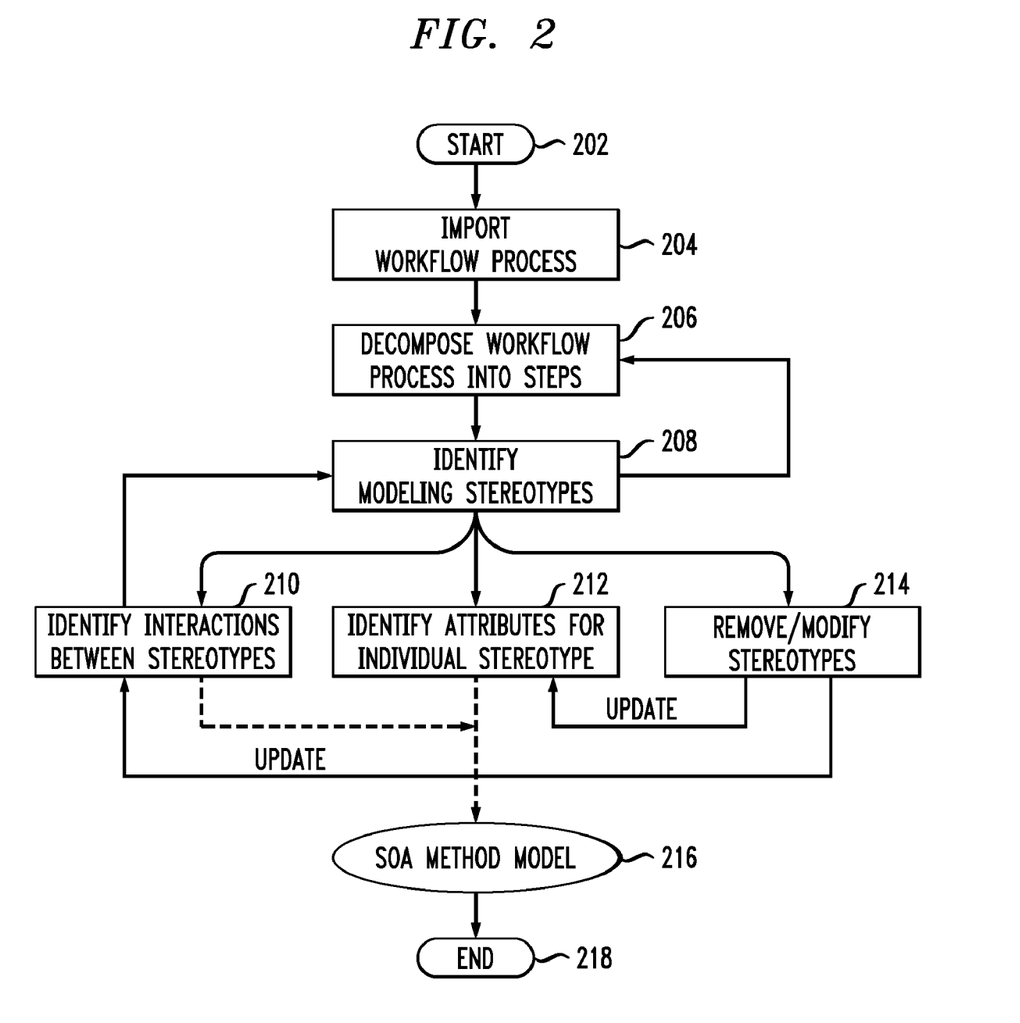
FIG. 2 is a flow diagram illustrating an exemplary meta-data management action flow, according to another aspect of the invention.

FIG. 2 is a flow diagram illustrating an exemplary meta-data management action flow, according to another aspect of the invention. Step 202 includes starting or initiating one or mole embodiments of the present invention. Step 204 includes importing one or mole workflow processes. Step 206 includes decomposing one or more workflow processes into sub-steps. Step 208 includes identifying modeling stereotypes. Step 210 includes identifying interactions between stereotypes. Step 212 includes identifying attributes for an individual stereotype. Step 214 includes removing and/or modifying one or more stereotypes. Step 216 includes creating a SOA-method model. One or mole embodiments of the present invention ends with step 218, but the skilled artisan will appreciate that one or mole of the steps may be repeated prior to completion.

Exemplary meta-data model management describes the manipulations to model assets. The manipulations include creating, editing and removing specific model assets or relationships between assets. The action flow of the meta-data modeling management is shown in FIG. 2.

The steps of the meta-data model management action flow, as illustrated in FIG. 2, are further described below. The process of the meta-data model management can start from the starting step 202 or any phase depending on specific inputs.

The step of importing one or more workflow processes 204 may include taking a workflow process as input to define high-level entity goals.

The step of decomposing one or mole workflow processes into sub-steps 206 may include decomposing the overall high-level workflow process descriptions into sub-steps which define the detailed steps of the workflow process and thus provides guidance for workflow process practitioners.

The step of identifying modeling stereotypes 208 may be an iterative step. The modeling stereotypes are the modeling assets which are derived from workflow processes. The stereotypes are generalized modeling elements which can be instantiated when constructing a specific SOA-application solution. The stereotypes are identified along with the workflow process decomposition. Therefore, the decomposed modeling process is refined when additional stereotypes are derived.

The step of identifying attributes for an individual stereotype 212 may include attributes of a stereotype, which may define the key features as well as their types and values for a specific stereotype. A general stereotype can be instantiated by setting its attributes to specific values.

The step of identifying interactions between stereotypes 210 may include interactions between stereotypes which define dependencies and relationships between stereotypes. The step of identifying interactions between stereotypes 210 may be an iterative step in that additional stereotypes may be discovered during exploring the interactions with other stereotypes.

The step of removing and/or modifying one or more stereotypes 214 may include changes to the stereotype that will affect step 212 and step 210 in that existing attributes or interactions may be removed and new attributes or interactions may be added.

The step of creating an SOA-method model 216 may include the above-described action flow resulting in a SOA method model which is the basis for a modeling process to guide the application-specific SOA solution practices. The resulting SOA-method model becomes the input to further modeling realization as shown in FIG. 3.

Figure 3:
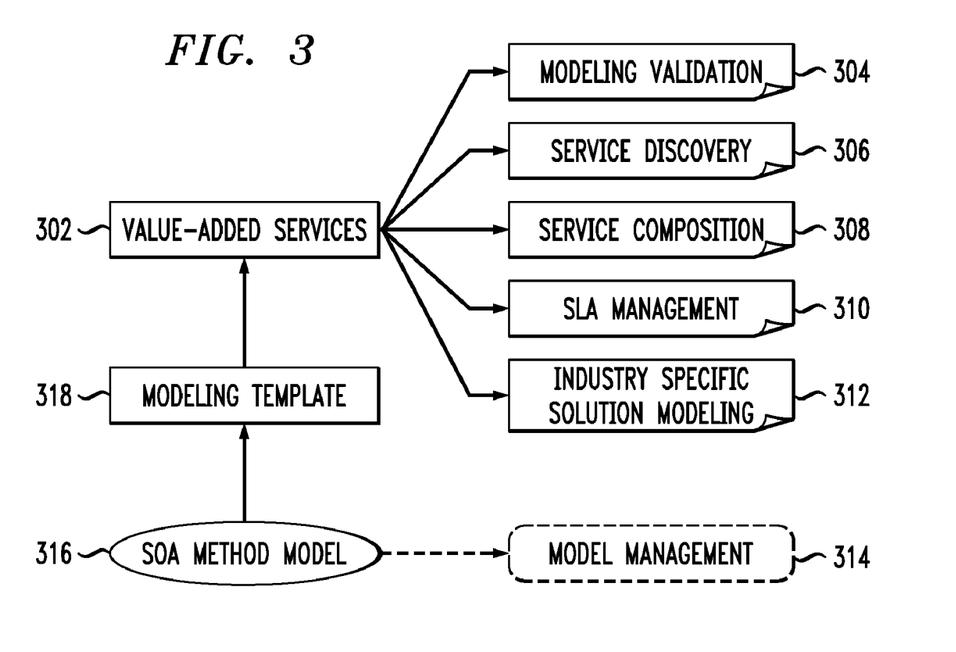
FIG. 3 is a diagram illustrating an exemplary representation of a model realization, according to another aspect of the invention.

FIG. 3 shows a diagram illustrating an exemplary representation of a model realization, according to another aspect of the invention. FIG. 3 includes components such as value-added services 302, modeling validation 304, service discovery 306, service composition 308, service level agreement (SLA) management 310, industry-specific solution modeling 312, model management 314, SOA-method model 316, and modeling template 318.

The modeling template is an exemplary formalized guide for conducting specific SOA solution processes. An application-oriented modeling template can be derived from a SOA-method model by realizing various types of workflow processes. The components of FIG. 3 are further described below.

Value-added services 302 may include a set of value-added services that can be created from the modeling template. Modeling validation 304 may include applying the model to industry cases to examine whether the modeling elements capture every step and feature of the specific applications. Service discovery 306 may include additional services that can be discovered when utilizing a modeling template for specific SOA applications. Service composition 308 may include dependencies between services that can be identified during modeling realization, and thus, compositions of services can be derived. Service Level Agreement (SLA) management 310 may include an SLA, which, as an example, may define a contract between services provider and services consumer to guarantee that the per formed services meet the agreement. Industry-specific solution modeling 312 may include specific models that can be derived from a modeling template to cater to various types of industry needs. Model management 314 and manipulation can be conducted as shown in FIG. 2.

Figure 4:
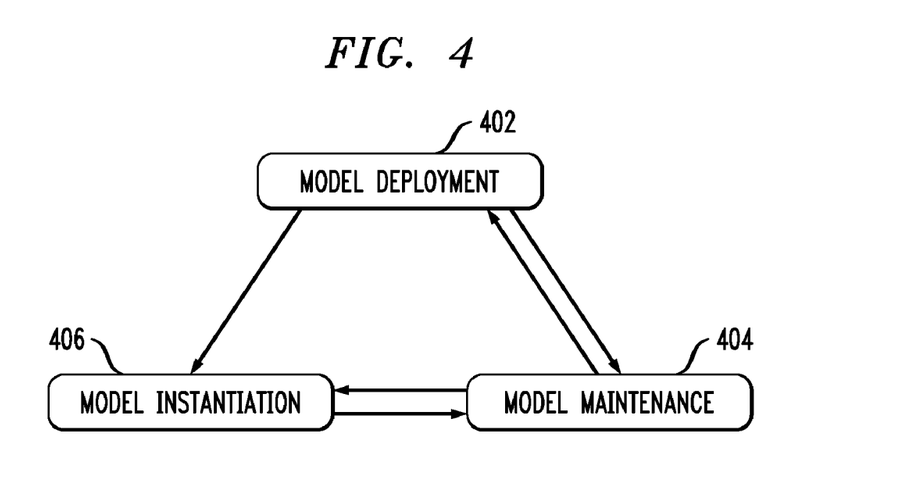
FIG. 4 is a diagram illustrating an exemplary representation of a meta-data model enablement lifecycle, according to another aspect of the invention.

FIG. 4 is a diagram illustrating an exemplary representation of a meta-data model enablement life-cycle, according to another aspect of the invention. FIG. 4 includes components such as model deployment 402, model maintenance 404 and model instantiation 406. After the model is deployed 402, the model can be instantiated 406 to support industry-specific applications. Model maintenance 404 takes place both during model deployment 402, when any changes need to be made to modeling elements, and model instantiation 406, when actions need to be performed for specific applications.

The model enablement life-cycle provides extensibility. Two possible changes, for example, may happen to an existing model. One, by way of example, is modifying existing modeling assets. Thus, changes to corresponding attributes or interactions can be adapted without changing the underlying model structure. Another change, by way of example, is adding new assets to the model. Thus, new attributes or interactions can be identified and corresponding changes to model structure can be performed.

Figure 5:
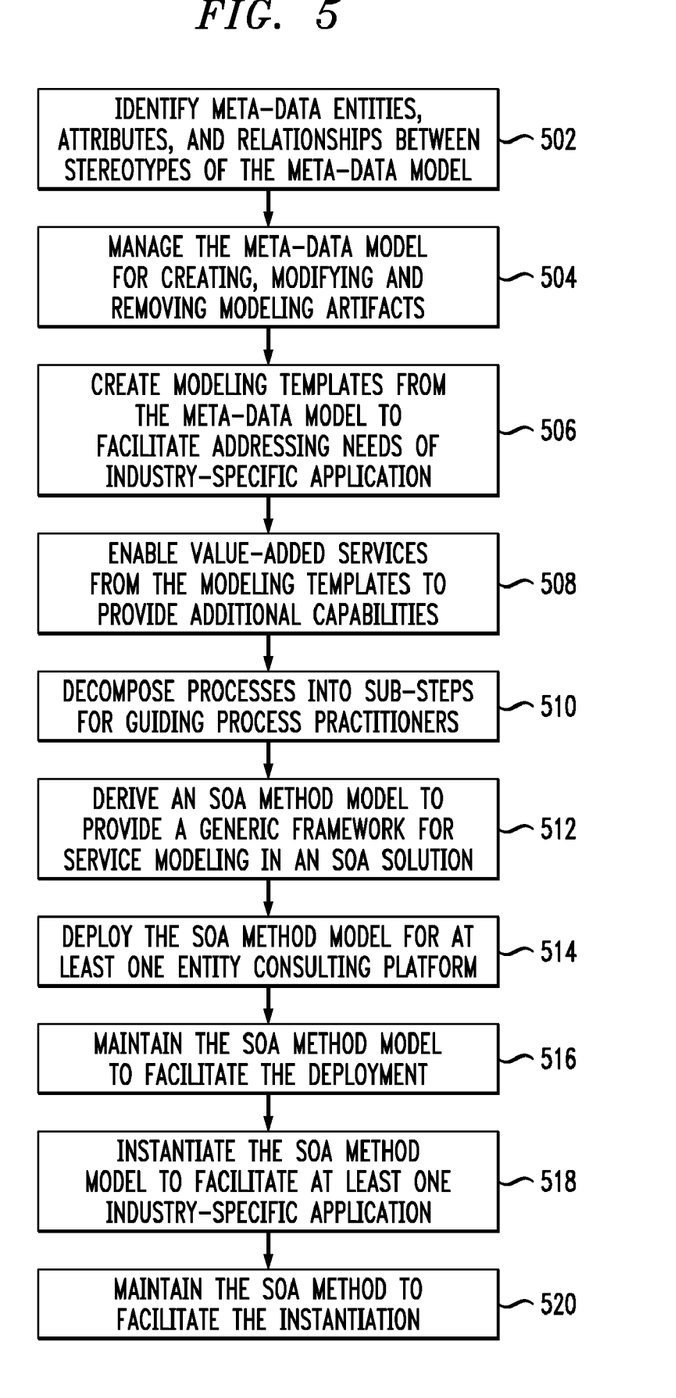
FIG. 5 is a flow diagram illustrating an exemplary method for service-oriented architecture (SOA) process decomposition and service modeling, wherein a meta-data model is a formalization of the SOA, according to another aspect of the invention.

FIG. 5 shows a flow diagram illustrating an exemplary method for service-oriented architecture (SOA) process decomposition and service modeling, wherein a meta-data model is a formalization of the SOA, according to one aspect of the invention. The skill artisan will appreciate that the descriptions above illustrate detailed embodiments for service-oriented architecture (SOA) process decomposition and service modeling. In broader terms, one or more embodiments of the invention may include steps 502, 504 and 506. Step 502 includes identifying meta-data entities, attributes, and relationships between stereotypes of the meta-data model. Identifying meta-data entities may include iteratively identifying interactions between the meta-data entities during the identification step to capture additional information. Additional information may include, for example, additional meta-data entities or additional interactions between existing meta-data entities, and information for validating constraints for existing meta-data entities or relations. Identifying meta-data entities may also include iteratively identifying the meta-data entities during the process of decomposition to capture a plurality of aspects of the process. Aspects may, for example, represent various perspectives, intermediate products or steps of a process. Step 504 includes managing the meta-data model for creating, modifying and removing modeling artifacts. Step 506 includes creating modeling templates from the meta-data model to facilitate addressing needs of industry-specific application.

One or more embodiments of the invention may also include one or more of steps 508, 510, 512, 514, 516, 518 and 520. Step 508 includes enabling value-added services from the modeling templates to provide additional capabilities. Such capabilities, for example, may include model validation, service discovery, service composition, service level agreement (SLA) management and industry-specific solution modeling. Step 510 includes decomposing processes to sub-steps for guiding process practitioners. Step 512 includes deriving an SOA-method model to provide a generic framework for service modeling in an SOA solution. Step 514 includes deploying the SOA-method model for at least one entity consulting platform to increase productivity of at least one practitioner. Step 516 includes maintaining the SOA-method model to facilitate the deployment. Step 518 includes instantiating the SOA-method model to facilitate at least one industry-specific application. Step 520 includes maintaining the SOA-method to facilitate the instantiation.

Further, one or more embodiments of the invention may include using at least one model template to be instantiated for validating SOA solutions, and may also include guiding SOA practitioners. One or more embodiments of the invention may additionally include using stereotypes derived from a UML meta-class to build the method profiles for at least one aspect of an workflow process, and may also include realizing the steps of the techniques in at least one model template to formalize an workflow process.

Figure 6:
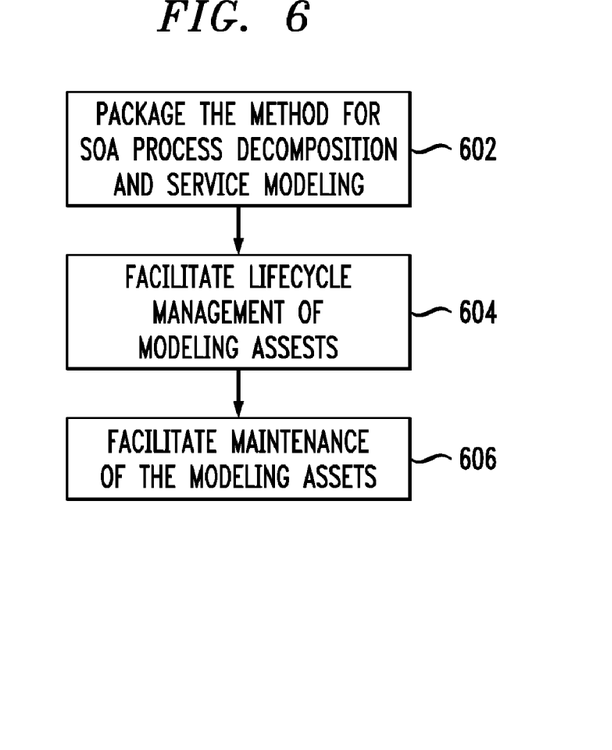
FIG. 6 is a flow diagram illustrating an exemplary method for enabling a method for SOA process decomposition and service modeling, according to another aspect of the invention.

FIG. 6 shows a flow diagram illustrating an exemplary method for enabling a method for SOA process decomposition and service modeling, according to another aspect of the invention. The skill artisan will appreciate that the descriptions above also illustrate detailed embodiments for enabling a method for SOA process decomposition and service modeling. In broader terms, one or more embodiments of the invention may include steps 602, 604 and 606. Step 602 includes packaging said method for SOA process decomposition and service modeling. Packaging the techniques may include customizing a modeling template for at least one industry-specific application. Packaging the techniques may also include providing a general framework for consulting services to build value-added services. Step 604 includes facilitating life-cycle management of modeling assets. Step 606 includes facilitating maintenance of the modeling assets.

A variety of techniques, utilizing dedicated hardware, general purpose processors, firmware, software, or a combination of the foregoing may be employed to implement one or more embodiments of the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 7:
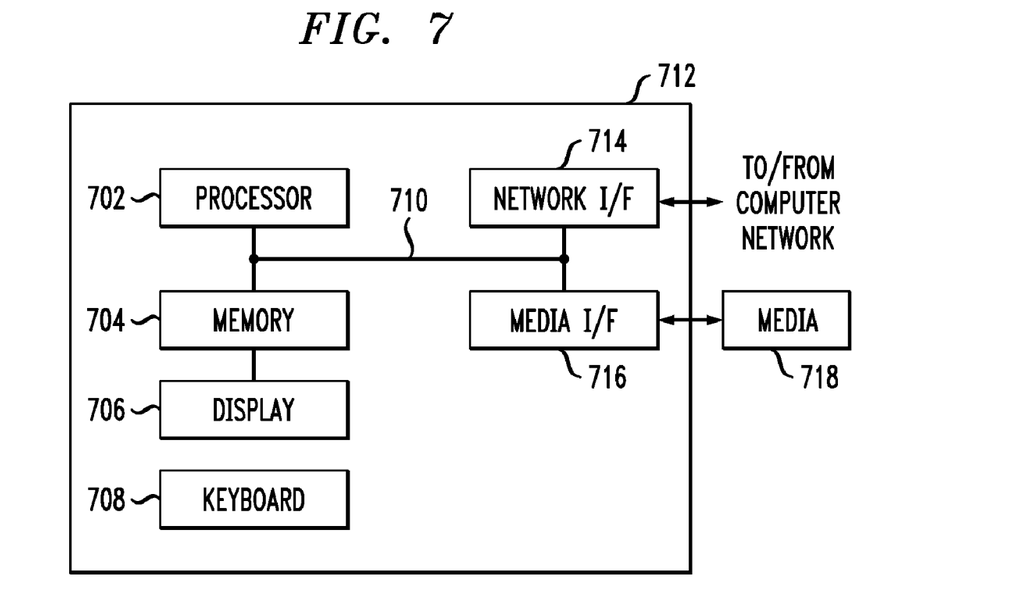
FIG. 7 is a system diagram of an exemplary computer system on which at least one embodiment of the present invention can be implemented.

At presents it is believed that the preferred implementation will make substantial use of software running on a general purpose computer or workstation. With reference to FIG. 7, such an implementation might employ, for example, a processor 702, a memory 704, and an input and/or output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (fox example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 702, memory 704, and input and/or output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or mole of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory (for example, memory 704), magnetic tape, a removable computer diskette (for example, media 718), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in older to reduce the number of times code must be retrieved from bulk storage during execution.

Input and/or output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for service-oriented architecture (SOA) process decomposition and service modeling, wherein a meta-data model is a formalization of said SOA, comprising the steps of:

identifying meta-data entities, attributes of said meta-data entities and relationships between stereotypes of said meta-data model;

managing said meta-data model for creating, modifying and removing modeling artifacts;

creating modeling templates from said meta-data model to facilitate addressing needs of industry-specific applications; and enabling value-added services from said modeling templates to provide capabilities comprising at least one of model validation, service discovery, service composition, service level agreement (SLA) management and industry-specific solution modeling.

2. The method of claim 1, further comprising the step of: decomposing processes into sub-steps for guiding process practitioners.

3. The method of claim 1, wherein the step of identifying meta-data entities comprises the step of:
iteratively identifying said meta-data entities during said process decomposition to capture a plurality of aspects of said process.

4. The method of claim 1, wherein the step of identifying meta-data entities comprises the step of:
iteratively identifying interactions between said meta-data entities during said identification step to capture additional information.

5. The method of claim 1, further comprising the step of: deriving an SOA-method model to provide a generic framework for service modeling in an SOA solution.

6. The method of claim 5, further comprising the step of: deploying said SOA-method model for at least one entity consulting services platform to increase productivity of at least one practitioner.

7. The method of claim 6, further comprising the step of: maintaining said SOA-method model to facilitate said deployment.

8. The method of claim 5, further comprising the step of: instantiating said SOA-method model to facilitate at least one industry-specific application.

9. The method of claim 8, further comprising the step of: maintaining said SOA-method model to facilitate said instantiation.

10. An apparatus for SOA process decomposition and service modeling, wherein a meta-data model is a formalization of content of said SOA, comprising:
a memory; and
at least one processor coupled to said memory and operative to:
identify meta-data entities, attributes of said meta-data entities and relationships between stereotypes of said meta-data model;
manage said meta-data model for creating, modifying and removing modeling artifacts;
create modeling templates from said meta-data model to facilitate addressing needs of industry-specific applications; and
enable value-added services from said modeling templates to provide capabilities comprising at least one of model validation, service discovery, service composition, service level agreement (SLA) management and industry-specific solution modeling.

11. The apparatus of claim 10, further comprising at least one processor coupled to said memory and operative to:
use at least one model template to be instantiated for validating SOA solutions; and
guide SOA practitioners.

12. The apparatus of claim 10, which further comprises: stereotypes derived from a unified modeling language (UML) meta-class to build said method profiles for at least one aspect of a workflow process.

13. The apparatus of claim 10, wherein said method steps are realized in said at least one model template to formalize a workflow process.

14. The apparatus of claim 10, further comprising at least one processor coupled to said memory and operative to:
derive an SOA-method model to provide a generic framework for service modeling in an SOA solution.

15. The apparatus of claim 14, further comprising at least one processor coupled to said memory and operative to:
deploy said SOA-method model for at least one entity consulting services platform to increase productivity of at least one practitioner.

16. The apparatus of claim 14, further comprising at least one processor coupled to said memory and operative to:
instantiate said SOA-method model to facilitate at least one industry-specific application.

17. The apparatus of claim 10, further comprising at least one processor coupled to said memory and operative to:
decompose processes into sub-steps for guiding process practitioners.

18. The apparatus of claim 10, wherein the operation of identifying meta-data entities comprises iteratively identifying said meta-data entities during said process decomposition to capture a plurality of aspects of said process.

19. A computer program product comprising a tangible computer useable readable recordable medium having computer useable program code for service-oriented architecture (SOA) process decomposition and service modeling, wherein a meta-data model is a formalization of said SOA, said computer program product including:
computer useable program code for identifying meta-data entities, attributes of said meta-data entities and relationships between stereotypes of said meta-data model;
computer useable program code for managing said meta-data model for creating, modifying and removing modeling artifacts;
computer useable program code for creating modeling templates from said meta-data model to facilitate addressing needs of industry-specific applications; and
computer useable program code for enabling value-added services from said modeling templates to provide capabilities comprising at least one of model validation, service discovery, service composition, service level agreement (SLA) management and industry-specific solution modeling.

20. The computer program product of claim 19, further comprising:
computer useable program code for decomposing processes into sub-steps for guiding process practitioners.

21. The computer program product of claim 19, wherein the computer useable program code for identifying meta-data entities comprises iteratively identifying said meta-data entities during said process decomposition to capture a plurality of aspects of said process.

22. The computer program product of claim 19, further comprising:
program code for deriving an SOA-method model to provide a generic framework for service modeling in an SOA solution.

23. The computer program product of claim 22, further comprising:
program code for deploying said SOA-method model for at least one entity consulting services platform to increase productivity of at least one practitioner.

24. The computer program product of claim 23, further comprising:
   computer useable program code for maintaining said SOA-method model to facilitate said deployment.

25. The computer program product of claim 22, further comprising:
   computer useable program code for instantiating said SOA-method model to facilitate at least one industry-specific application.

26. The computer program product of claim 25, further comprising:
   computer useable program code for maintaining said SOA-method model to facilitate said instantiation.

* * * * *